United States Patent [19]

Muraoka et al.

[11] 4,010,333

[45] Mar. 1, 1977

[54] RECORD DISC RECORDING SYSTEM WITH A DISTORTION SIGNAL

[75] Inventors: Teruo Muraoka, Sagamihara; Kazunori Nisikawa, Fujisawa; Kohji Seki, Ichikawa, all of Japan

[73] Assignee: Victor Company of Japan, Limited, Yokohama, Japan

[22] Filed: July 28, 1975

[21] Appl. No.: 599,581

[30] Foreign Application Priority Data

June 28, 1974 Japan .............................. 49-86233

[52] U.S. Cl. .......................................... 179/100.4 C

[51] Int. Cl.[2] .......................................... G11B 3/00

[58] Field of Search ............. 179/100.4 R, 100.4 C, 179/100.4 A, 100.4 ST

[56] References Cited

UNITED STATES PATENTS

| | | | |
|---|---|---|---|
| 3,229,048 | 1/1966 | Fox | 179/100.4 C |
| 3,403,233 | 9/1968 | Cooper | 179/100.4 C |
| 3,457,374 | 7/1969 | Klemp et al. | 179/100.4 C |
| 3,484,566 | 12/1969 | Kuriyagawa et al. | 179/100.4 C |

FOREIGN PATENTS OR APPLICATIONS

| | | | |
|---|---|---|---|
| 1,225,405 | 9/1966 | Germany | 179/100.4 C |
| 1,118,381 | 7/1968 | United Kingdom | 179/100.4 C |

OTHER PUBLICATIONS

Kantrowitz, High—Frequency Stylus—Groove Relationships in Phonograph Cartridge Transducers, Jour. of the AES, July, 1963, vol. 11, No. 3, pp. 250–262.

Redlich et al., A New Method of Disc Recording for Reproduction with Reduced Distortion: The Tracing Simulator, J. of the AES, vol. 13, No. 2, Apr. 1965, pp. 111–118.

Shiga, Deformation Distortion in Disc Records, Jour. of the AES, vol. 14, No. 13, July 1966, pp. 208–217.

*Primary Examiner*—Raymond F. Cardillo, Jr.

[57] ABSTRACT

A record disc recording system comprises a circuit for producing a signal which is substantially $2V^2 \cdot a$, where; $V$ is the relative velocity between a cutter head and a disc, and $a$ is a specific coefficient, which varies in accordance with the traversing of the cutter head over the disc. A circuit produces a distortion signal $\{f'(t)\}^2/\{2V^2 \cdot a - f''(t)\}$ (wherein $|2V^2 \cdot a > f''(t)|$) responsive to an original signal $f(t)$ and to the signal $2V^2 \cdot a$. Another circuit produces a recording signal $g(t)$ with distortion (where $g(t) = f(t) + \{f'(t)\}^2/2\{2V^2 \cdot a - f''(t)\}$) responsive to the original signal $f(t)$ and to the distortion signal $\{f'(t)\}^2/\{2V^2 \cdot a - f''(t)\}$. A cutter head records the signal $g(t)$ on a record disc.

6 Claims, 17 Drawing Figures

31

RECORD DISC RECORDING SYSTEM WITH A DISTORTION SIGNAL

BACKGROUND OF THE INVENTION

The present invention relates generally to record disc recording systems and more particularly to systems which import a predistortion during recording, to prevent tracing distortion during reproducing.

In general, the sound groove of a record disc is formed by cutting a V-shaped groove. The reproducing system traces the sound groove with a pickup reproducing stylus having a circular cross section at the part which contracts the walls of the sound groove. For this reason, the path of the tracing tip, of the reproducing stylus, differs from the track of the tip of the recording stylus. A so-called tracing distortion is generated in the reproduced signal, whereby the tone quality of the reproduced sound deteriorates greatly.

In a four-channel record disc in an angle-modulated wave of a wave band outside audio-frequency, is recorded by being multiplexed with a direct-wave signal. The tracing distortion causes, not only a deterioration of the tone quality in the reproduced sound, but also an interference of the angle-modulated wave by a distortion component of the direct-wave signal. These distortions give rise to an admixing of an extraneous signal component in the demodulation output of the angle-modulated wave or a generation of abnormal sound, due to interference.

Accordingly, an object is to eliminate the effect of tracing distortion, at the time of reproduction. To do this, the recording signal is given a pre-distortion which is complementary to the tracing distortion which is generated at the time of reproduction.

One method used heretofore has used for this measure has introduced a distortion which is a direct simulation of the state of the reproducing stylus tip. Examples of systems using this method are the so-called correlator and the skew sampling systems, for distortion signal recording.

In the correlator system, however, elaborate delay circuits and gate circuits are required. The electrical circuitry has been disadvantageously complicated. Particularly, as in a four-channel record disc system, an amply flat amplitude characteristic and a linear phase characteristic are required until a high frequency range (for example, 45 KHz) is reached. The transmission characteristics of the delay circuits themselves must be amply good. Moreover, a large number of unit delay circuits are necessary.

In the skew sampling system, sampling is necessary. In order to apply this system to the four-channel record disc system, it is necessary to use a suitably high sampling frequency. This is difficult to carry out in practice. Even if it is possible, other problems are encountered, such as a highly expensive circuitry.

SUMMARY OF THE INVENTION

In accordance with the present invention, a record disc recording system records a signal having a complementary distortion (hereinafter referred to simply as "distortion"), whereby it does not generate a tracing distortion at the time of reproducing. This recording signal involves a procedure which comprises an algebraic analysis, with respect to a curve approximating a circle, contacting the recording waveform. This analysis provides a curvilinear shape, obtainable by a general solution. The basic algebraic equation introduces an equation conforming to this shape, to minimize the deviation thereof from the circle, and to carry out a computation operation in accordance with this basic equation. The analysis is by means of an electrical circuit.

Accordingly, a general object of the invention is to provide a novel and useful record disc recording system in which the above described problems have been overcome.

Another and more specific object of the invention is to provide a record disc recording system which eliminates tracing distortion which might occur during a tracing of the sound groove by the reproducing stylus in the reproducing system. Tracing Distortion is prevented by imparting beforehand, a distortion complementary to a tracing distortion likely to occur in the recording signal.

In accordance with the present invention, an equation is used to impart a distortion signal by considering a parabola as a curve for approximating the circular shape of the tip of the reproducing stylus. Into the equation of the recording signal having a distortion obtained by this solution, a condition is introduced for preventing a discontinuity in the recording signal waveform. More desirably, a condition is imparted for minimizing the deviation from the above mentioned circle of the parabola, considered as a curve approximating this circle. In the system of the present invention, a simple circuit is used for recording a signal having a complementary distortion for compensating for tracing distortion.

Other objects and further features of the invention will be apparent from the following detailed description when read in conjunction with the accompanying drawings.

DETAILED DESCRIPTION

Figure 1:
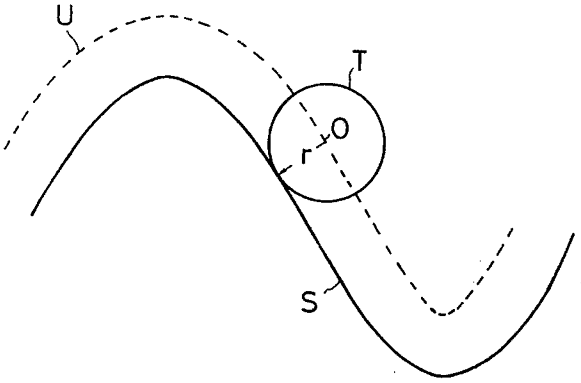
FIG. 1 is a graphical representation explaining the principle whereby tracing distortion is generated.

FIG. 1 shows how tracing distortion is generated.

It will be assumed that a reproducing stylus T has a tip with circular shape of a radius *r*. This reproducing stylus traces a contiguous contact against a recording signal waveform S, recorded in the sound groove of a record disc. Since the tip of the reproducing stylus T has a radius *r*, the locus or track of the center O of the stylus tip T is as indicated by dashed line U. As this tracing is carried out, it inevitably assumes a waveform which is distorted relative to the recorded signal waveform S.

Figure 2:
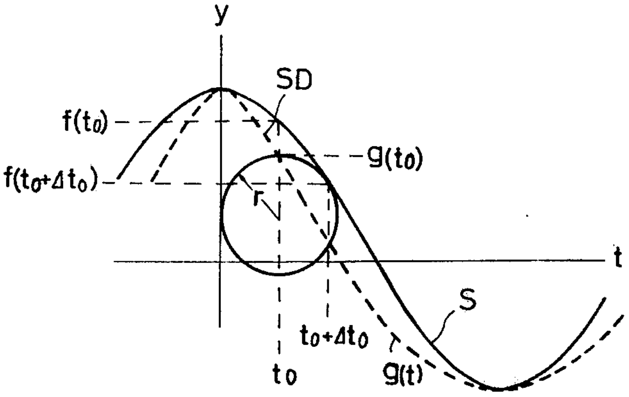
FIG. 2 is a graph indicating the waveform of a recording signal to which a complementary distortion has been imparted to prevent the generation of tracing distortion at the time of reproduction.

Accordingly, one measure for causing the center O of the tip of the stylus T to trace the same form as the signal waveform S is to record the signal with a waveform indicated by dashed line SD, instead of the signal waveform S, as indicated in FIG. 2.

Then, assume that the circle of radius *r* is in contact with the signal waveform S, represented by a function $f(t)$. The waveform SD has a distortion represented by a function $g(t)$ and is the locus of the peripheral positions of the stylus tip, at a time instant corresponding to the center of the circle.

Here, the above mentioned waveforms will be denoted respectively by $f(to)$ and $g(to)$, at the time instant *to*, and $f(to + \Delta to)$ and $g(to + \Delta to)$, at a time instant $(to + \Delta to)$. Then, the following relationships are obtained:

$$to + \Delta to = to + r \sin\left[\tan^{-1}\left\{\frac{d}{dt} \cdot f(to)\right\}\right]$$

$$g(to + \Delta to) = f(t) + r \cos\left[1 - \cos\left\{\tan^{-1}\left(\frac{d}{dt} \cdot f(t)\right)\right\}\right]$$

However, it is not possible to obtain an equation for $g(t)$ with respect to $f(t)$ in general, from the above two equations. For this reason, it is not possible for the analysis of the above equations to be carried out by a simple electrical circuit, capable of providing a recording signal to which a complementary distortion has been imparted. This complementary distortion prevents a generation of a tracing distortion, at the time of reproduction.

Accordingly, in accordance with the present invention, a parabola is selected as a curve approximating the circle of the reproducing stylus tip. The above set forth equations are solved by means of this parabola.

Figure 3:
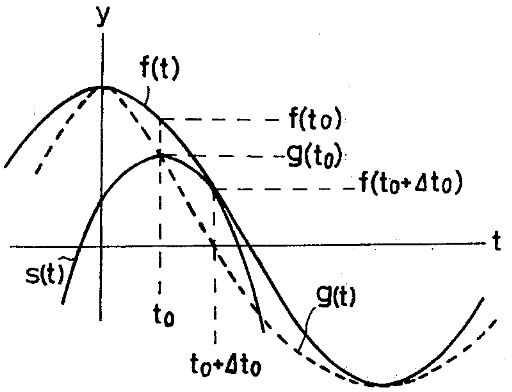
FIG. 3 is a similar graph indicating the waveform of a recording signal to which a complementary distortion has been imparted, using a parabola as a curve approximating a circle.

First, the tracing of a reproducing stylus tip of parabolic shape, in contact against the original recording signal waveform $f(t)$, is indicated in FIG. 3. The original recording signal waveform $f(t)$, the waveform $g(t)$ of the signal having a distortion, and the parabolic waveform $S(t)$ are respectively denoted by $f(to)$, $g(to)$, and $S(to)$, at the time instant *to*, and by $f(to + \Delta to)$, $g(to + \Delta to)$, and $S(to + \Delta to)$, at the time instant $(to + \Delta to)$. Then, if the point at which the parabola $S(t)$ contacts the waveform $f(t)$ is assumed to be at the point of time $(to + \Delta to)$, $f(to + \Delta to)$ can be expressed as follows:

$$f(to + \Delta to) = f(to) + f'(to).\Delta to + \tfrac{1}{2}f''(to).(\Delta t)^2 + \ldots \approx f(to) + f'(to).\Delta to + \tfrac{1}{2}f''(to).(\Delta t)^2 \quad (1)$$

On one hand, since the stylus tip is a parabola, the following expressions are obtained from FIG. 3:

$$S(to + \Delta to) = a(\Delta to)^2 + g(to) \quad (2)$$

$$f(to + \Delta to) = S(to + \Delta to) \quad (3)$$

In Eq. (2), *a* is a coefficient described hereinafter. From Eq. (3), the following expression is obtained:

$$f(to) + f'(to).\Delta to + \tfrac{1}{2}f''(to).(\Delta to)^2 - a(\Delta to)^2 - g(to) = 0 \quad (4)$$

When, Eq. (4) is rearranged relative to $(\Delta to)$, the following equation is obtained:

$$\{\tfrac{1}{2}f''(to) - a\}(\Delta to)^2 + f'(to).\Delta to + \{f(to) - g(to)\} = 0 \quad (5)$$

Since the waveform $S(to)$ is in contact with the waveform $f(t)$ at a single point, the following equation is obtained from the equal root condition:

$$\{f'(to)\}^2 - 4\{\tfrac{1}{2}f''(to) - a\}\{f(to) - g(to)\} = 0 \quad (6)$$

From this, the following equation is obtained:

$$g(to) = f(to) + \frac{\{f'(to)^2\}}{4\left\{a - \frac{1}{2}f''(to)\right\}} \quad (7)$$

Two questions should be considered next. First, how does the waveform $g(t)$ vary with respect to the radial variations of the position of the reproducing point in the disc sound groove (or the relative linear velocity V of the reproducing stylus and the disc)? Second, what are the optimum conditions at the time of approximating the circle with the parabola?

While the consideration of the above Eqs. (1) through (7) is based on unit linear velocity, the above mentioned relative linear velocity varies in accordance with the radial position of the cutter head on the disc. For this reason:

$$\left.\begin{array}{l} f(to) = f(t) \\ to = V \cdot t \end{array}\right\} \quad (8)$$

Consequently, $$\left.\begin{array}{l} f'(to) = \frac{f'(t)}{V} \\ f''(to) = \frac{f''(t)}{V^2} \end{array}\right\} \quad (9)$$

By substituting Eq. (9) in Eq. (7), the following expression is obtained:

$$g(t) = f(t) + \frac{\{f'(t)^2\}}{\{2\ 2V^2 \cdot a - f''(t)\}} \quad (10)$$

When this Eq. (10) is studied, it is apparent that a setting of the distortion with respect to the size of the stylus tip and the variation of the linear velocity, conforming to radial variation of the disc reproducing sound groove position, can be accomplished merely by varying the term $2V^2 \cdot a$, in Eq. (10) in accordance with the various above mentioned factors.

A signal $g(t)$ is expressed by this Eq. (10). It has a distortion complementary to the tracing distortion and is used as the recording signal.

Then, since the shape of the stylus tip is assumed to be a parabola in the above consideration, some error occurs when the recording waveform of the above Eq. (10) is reproduced by a stylus having a circular tip. Accordingly, a method of holding this error to a minimum limit will next be considered.

Figure 4:
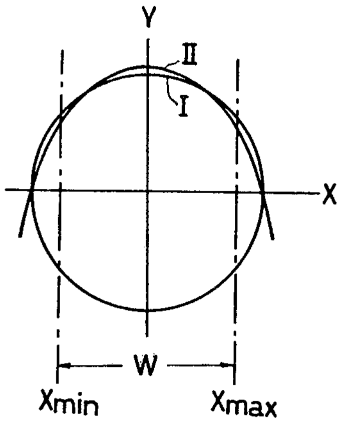
FIGS. 4 and 5 are graphs respectively indicating the manner in which a parabola approximates the above mentioned circle.

The circle I, of radius $r$, in FIG. 4 will be expressed by:

$$Y1 = \sqrt{r^2 - X^2} \quad (11)$$

and the parabola II will be expressed by:

$$Y2 = aX^2 + b \quad (12)$$

Furthermore, the range within the ±45° of angle of the sound groove slope is defined by the following equations, in the approximation range W:

$$\left.\begin{array}{l} X_{max} = \frac{r}{\sqrt{2}} \\ X_{min} = -\frac{r}{\sqrt{2}} \end{array}\right\} \quad (13)$$

Then, the minimum square approximation, by definition, is a determination of a parameter for minimizing the following quantity:

$$E = \int_{X_{min}}^{X_{max}} [Y1(X) - Y2(X)]^2 dX \quad (14)$$

Since, in FIG. 4, the error is an even function, an integration from zero to $X_{max}$ is sufficient and becomes as follows:

$$E = \int_0^{\frac{r}{\sqrt{2}}} \left\{ aX^2 + b - \sqrt{r^2 - X^2} \right\} dX$$

$$= \frac{a^2 r^2}{20\sqrt{2}} + \frac{1}{6\sqrt{2}}(2ab - 1)r^3 + \frac{1}{\sqrt{2}}(b^2 + r^2)r +$$

$$\frac{ar^4}{8} - \frac{2+\pi}{4} r^2 \left( \frac{ar^2}{4} + b \right) \quad (15)$$

The minimum value of $E$ of this Eq. (15) for $$a = \frac{10\sqrt{2}}{r^2} \left\{ \frac{\pi r}{16} - \frac{b}{3\sqrt{2}} \right\}$$

is as follows:

$$E_{min} = r \left\{ \frac{640 - 15\sqrt{2}\,\pi^2}{768\sqrt{2}} r^2 - \frac{12+\pi}{24} br + \frac{b^2}{\sqrt{2}} - \frac{5\sqrt{2}}{18} b^2 \right\} \quad (16)$$

The value of b, for further minimizing this Eq. (16), is obtained as:

$$b = \frac{9\sqrt{2}\,(12+\pi)}{192} r$$

Therefore, the following result is obtained:

$$a = -\frac{15\sqrt{2}\,(4-\pi)}{32r} \approx -\frac{0.57}{r} \quad (17)$$

Figure 5:
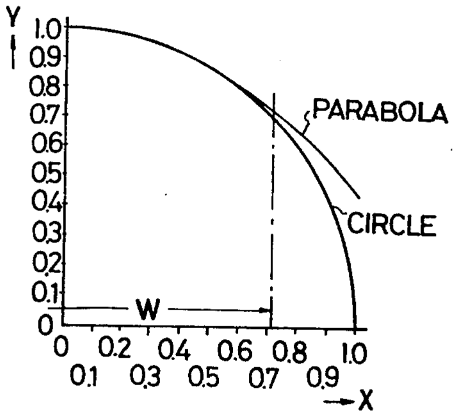

A comparison of one portion of the circle and the above mentioned approximation parabola is indicated in FIG. 5, in which W is the approximation interval.

By using the value of $a$, indicated in the above Eq. (17), as the $a$ in the previously given Eq. (10) and by recording signal $g(t)$, derived theoretically on the premise that the stylus tip is parabolic, it becomes possible for reproduction, substantially without generation of any tracing distortion, by a stylus having a circular tip.

Figure 6:
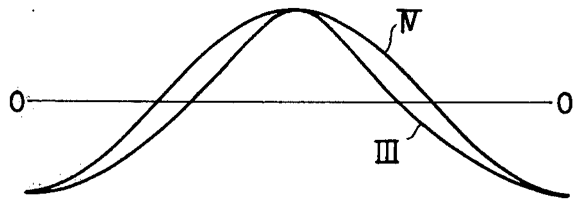
FIG. 6 is a graph showing the waveform of a recording signal having a distortion obtained from the above mentioned approximation by a parabola and the waveform of the original signal.

The waveform of a recording signal, having the distortion determined by Eq. (10), is indicated by curve III in FIG. 6. Curve IV in the same figure indicates the waveform of the original signal. By recording the signal of the waveform of curve III and by tracing the waveform of curve III during reproducing, a signal can be reproduced with the waveform of curve IV with substantially no distortion.

Figure 7:
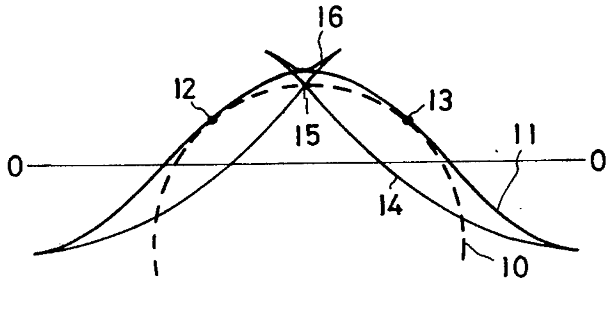
FIG. 7 is a graph describing the generation of a distortion signal caused by the curvature of a stylus point which is greater than the curvature of a signal waveform.

An important point in the consideration of tracing distortion is the relationship between the curvature of the reproducing stylus tip and the curvature of the signal waveform. There is no problem when the curvature of the stylus tip is less than the curvature of the signal waveform. In general, the curvature of the stylus tip is greater than the curvature of the signal waveform. For example, as indicated in FIG. 7, the stylus 10 contacts the original signal waveform 11 at two points 12 and 13. Consequently, the distortion signal waveform 14 assumes a pointed shape having a curvature inflection at point 15. The information is not reproduced in that portion of the signal waveform 11 between the points 12 and 13.

Accordingly, in order to reproduce the information of the signal waveform between the points 12 and 13, the distortion signal waveform must be recorded in a waveform as indicated by curve 16, but it is not physically possible to form a waveform of this shape. Therefore, a lack of information unavoidably occurs in the reproduced information since the curvature of the stylus tip is greater than that of the signal waveform.

Figure 8:
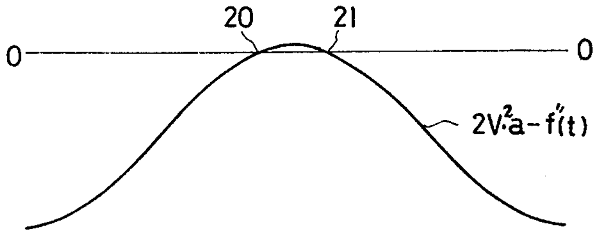
FIG. 8 is a graphical representation of a term $\{2V^2 \cdot a - f''(t)\}$ constituting one part of an equation representing a distortion signal obtained from a parabolic approximation.
Figure 9:
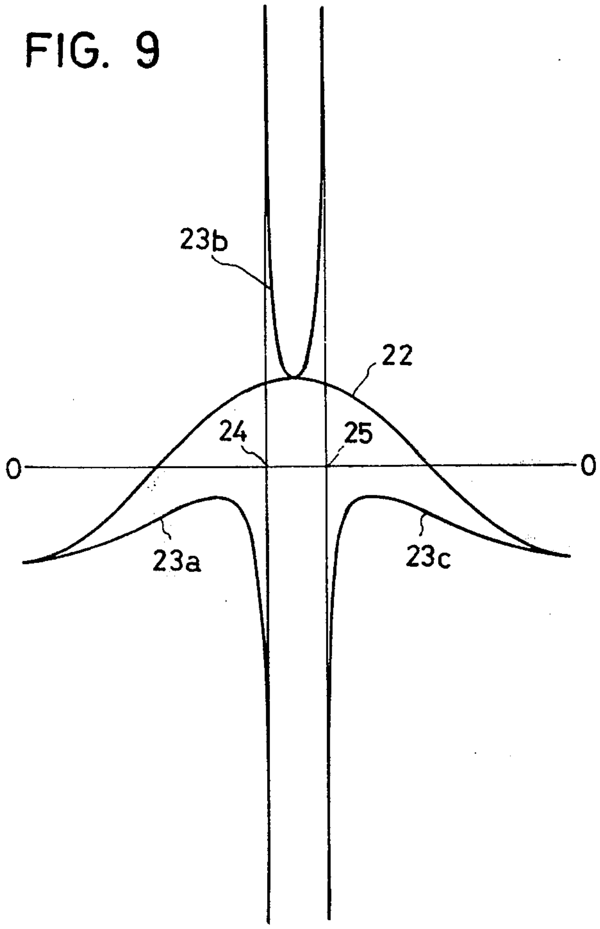
FIG. 9 is a graph describing a point of discontinuity in a recording signal, having the above mentioned distortion signal.

On one hand, at the time when the relationship between $2V^2 \cdot a$ and $f''(t)$ (the second term on the right-hand side of Eq. (10)) becomes $f''(t) > 2V^2 \cdot a$ from $2V^2 \cdot a > f''(t)$, the quantity $\{2V^2 \cdot a - f''(t)\}$ becomes zero at points 20 and 21 as indicated in FIG. 8. The recording signal $g(t)$, having the distortion of Eq. (10) when the state of $\{2V^2 \cdot a - f''(t)\} = 0$ occurs in this manner, becomes $\pm\infty$ as indicated in FIG. 9. The signal waveforms 23*a*, 23*b*, and 23*c* become discontinuous at points 24 and 25 corresponding to the above mentioned points 20 and 21, with respect to the original signal waveform 22.

It is not possible in actual practice to record by cutting, with a cutting stylus, discontinuous waveforms 23*a*, 23*b*, and 23*c* of this nature. Therefore, it is necessary to prevent the occurrence of this discontinuity.

Accordingly, in order to prevent this discontinuity of the recording signal, as indicated in FIG. 9, the relationship $|2V^2 \cdot a| > |f''(t)|$ must be continually maintained so as to prevent the state where $\{2V^2 \cdot a - f''(t)\} = 0$. This can be accomplished by restricting the maximum amplitude of $f''(t)$ so that it will always be less than the voltage value of $2V^2 \cdot a$, irrespective of the cutting position of the cutter on the disc. This amplitude limiting is by any suitable means such as a clipper, limiter, or slicer as described hereinafter.

Figure 10:
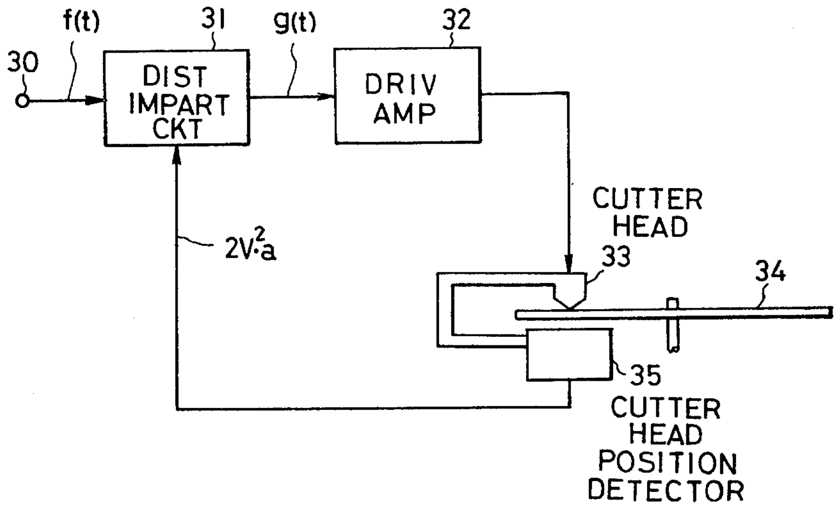
FIG. 10 is block diagram showing one embodiment of a record disc recording system, according to the invention.

The present invention has been reduced to practice on the basis of the foregoing considerations. It will now be described in concrete detail with respect to a specific embodiment of the record disc recording system of the invention. FIG. 10 shows, in block diagram, the essential parts of this embodiment of the record disc recording system. An original recording signal (hereinafter referred to simply as "original signal") which is processed as in a conventional recording system and then is introduced through an input terminal 30 of the system. This original signal is fed to a distortion imparting circuit 31 to produce a recording signal $g(t)$, having a distortion as expressed by Eq. (10). After being amplified by a cutter drive amplifier 32, this recording signal $g(t)$ is applied to a cutter head 33 and is recorded on a disc 34.

At the same time, as the cutter head 33 records on the disc 34, it moves from the outer periphery to the inner periphery of the disc. A voltage corresponding to $2V^2 \cdot a$ is supplied from a cutter head position detector 35 to the distortion imparting circuit 31 and there used as the $2V^2 \cdot a$ in Eq. (10).

Figure 11:
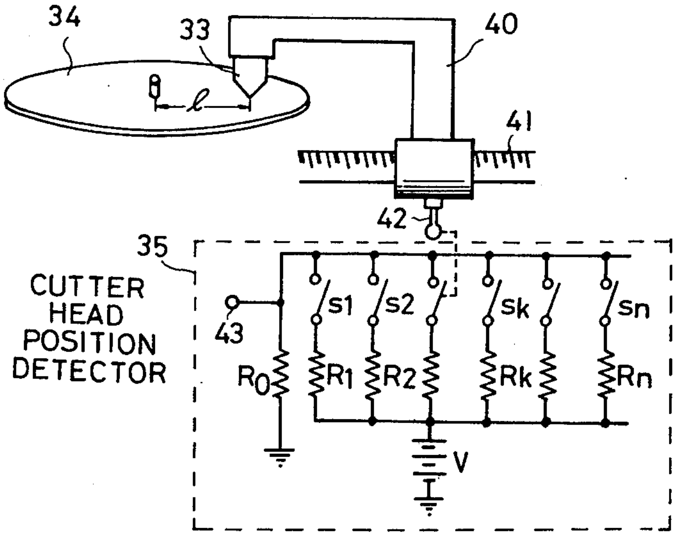
FIG. 11 is a combination of a block diagram and a circuit diagram showing one embodiment of a detector for detecting the position of a cutter head.

One embodiment of the cutter head position detector 35 is shown in FIG. 11. The cutter head 33 is held by one end of a cutter head holding arm 40. The other end has female screw threads engaged with a threaded shaft 41. This shaft 41 rotates in synchronism with the rotation of the disc 34. The holding arm 40 and the cutter head 33 move in concert therewith from the outer periphery to the inner periphery of the disc 34, as the stylus 33 records. In addition, the holding arm 40 is provided with a projecting member 42 fixed the end thereof which travels on the threaded shaft 41.

The cutter head position detector 35 comprises a circuit wherein a series of microswitches $sk$ (where $k$ is from 1 to $n$) are sequentially closed upon being contacted by the projecting member 42. Resistors R$k$ (where $k$ is from 1 to $n$) are connected in parallel. A resistor R$o$ is connected between the stationary contacts of the microswitches $sk$, which are all connected together. Ground (earth) and a power supply $v$ are connected between ground and the commonly connected terminals of the resistors R$k$. Hence, resistor R$o$ and an active one of the resistors R1-R*n* act as a voltage divider. When the projecting member 42 has contacted and is closing a microswitch $sk$, the voltage $vk$ is obtained at an output terminal 43 connected between the resistor R$o$ and the commonly connected stationary contacts of the microswitches $sk$. Voltage $vk$ becomes:

$$vk = \frac{Ro}{Ro + Rk}\, v$$

The relative linear velocity between the sound groove and the cutter head is proportional to the radial position l of the cutter head 33 on the disc 34. Accordingly, the voltage $2V^2 \cdot a$ can be produced by obtaining a voltage proportional to $l^2$. Then, by appropriately selecting the resistance values of the resistors R1 through R$n$ in accordance with the positions of the microswitches $s$1 through sn, a voltage response to $l^2$ can be obtained from the output terminal 43. By multiplying this voltage by a suitable coefficient, the objective voltage $2V^2 \cdot a$ is obtained. This voltage $2V^2 \cdot a$ is supplied to the distortion imparting circuit 31.

Next, one embodiment of the distortion imparting circuit 31 will be described with respect to the block diagram shown in FIG. 12.

This circuit receives the input signal $f(t)$ through an input terminal 50, corresponding the aforementioned input terminal 30. The original signal $f(t)$ is supplied to an addition circuit 51 and a differentiation circuit 52. The original signal $f(t)$ is differentiated by the differentiation circuit 52. The resulting output, a first order differential signal $f'(t)$, is supplied to a squaring circuit 53 and a differentiation circuit 55 to be respectively squared and differentiated. The output, $\{f'(t)\}^2$ of the squaring circuit 53 is supplied as a dividend to a division circuit 54.

The output second order differential signal $f''(t)$, differentiated by the differentiation circuit 55, is fed to a succeeding amplitude limiting circuit 56, where it is amplitude limited. This amplitude limiting circuit 56 comprises a clipper, a limiter, or a slicer which limits the amplitude of the signal $f''(t)$ to a value below the voltage value $$e \approx -2V^2\left(\frac{0.57}{r}\right).$$

Figure 15:
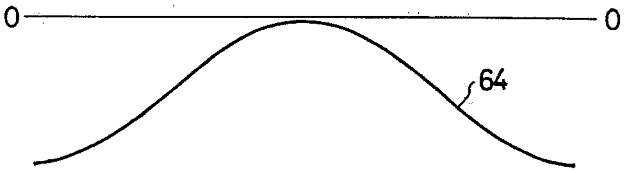
FIG. 15 is a similar graph indicating the waveform of the above mentioned term $\{2V^2 \cdot a - f''(t)\}$, wherein the second order differential signal $f''(t)$ has been amplitude limited by an amplitude limiter circuit.

The relative velocity V between the record and the cutter head and the radius $r$ of the reproducing stylus tip are parameters. Here, the amplitude limiting circuit 56 is a clipper. The waveform of the signal $f''(t)$, which has been amplitude limited, has the condition $|f''(t)|<|2V^2\cdot a|$ and is as indicated by waveform 61 in FIG. 13. However, if the circuit 56 is a limiter, the waveform of the signal $f''(t)$ is as indicated by waveform 64 in FIG. 15.

The signal $f''(t)$ amplitude limited by the amplitude limiting circuit 56 is supplied as a subtrahend to a subtraction circuit 57. At the same time, the voltage $2V^2\cdot a$ from the cutter head position detector 35 is being supplied as a minuend through a terminal 58, to this subtraction circuit 57. As a result of the subtraction in the subtraction circuit 57, an output signal $(2V^2\cdot a - f''(t))$ is supplied as a divisor to the division circuit 54.

The division circuit 54 carries out a division with the signal $\{f'(t)\}^2$ from the squaring circuit 53, as a dividend. The signal $\{2V^2\cdot a - f''(t)\}$ from the subtraction circuit 57 is a divisor which produces, as output, a distortion signal $\{f'(t)\}^2/\{2V^2\cdot a - f''(t)\}$, which is supplied to the addition circuit 51. This addition circuit 51 carries out a coefficient addition of the original signal $f(t)$ from the input terminal 50 and the distortion signal $\{f'(t)\}^2/\{2V^2\cdot a - f''(t)\}$ from the division circuit 54. Thereupon, a recording signal of $g(t) = f(t) + \{f'(t)\}^2/2\{2V^2\cdot a - f''(t)\}$ appears at an output terminal 59.

Figure 13:
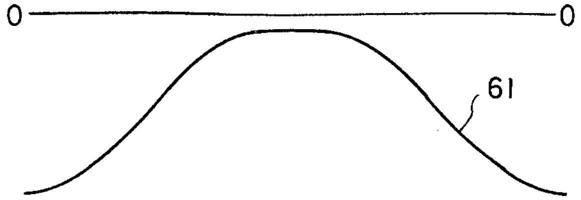
FIG. 13 is a graph indicating the waveform of the above mentioned term $\{2V^2 \cdot a - f''(t)\}$, wherein the second order differential signal $f''(t)$ has been amplitude limited in the clipping circuit.
Figure 14:
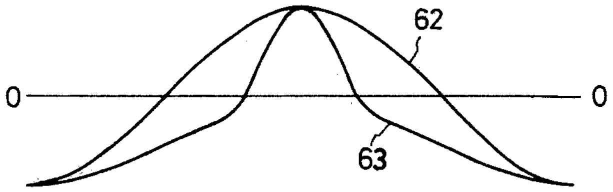
FIG. 14 is a similar graph indicating a recording signal having a distortion obtained by using the amplitude limited waveform signal indicated in FIG. 13.
Figure 16:
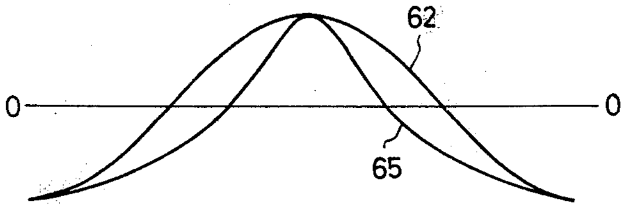
FIG. 16 is a similar graph indicating a recording signal having a distortion, obtained by using the amplitude limited waveform signal indicated in FIG. 15.

If the waveform of the amplitude limited signal $f''(t)$, produced as output of the amplitude limiting circuit 56, is as indicated by waveform 61 in FIG. 13, the waveform of the recording signal $g(t)$ obtained from the output terminal 59 becomes as indicated by waveform 63, relative to the original signal waveform 62 as indicated in FIG. 14. If the waveform of the amplitude limited signal $f''(t)$ is produced as output from the amplitude limiting circuit 56 it is as indicated by waveform 64 in FIG. 15. The waveform of the recording signal $g(t)$ obtained from the output terminal 59, becomes as indicated by waveform 65, relative to the original signal waveform 62 as indicated in FIG. 16.

Accordingly, when a recording signal with the distortion of the above-mentioned waveform 63 or 65 is cut and recorded on the disc, there is no tracing distortion at the time of reproducing, which might otherwise be caused by the reproducing stylus riding in the record groove.

Figure 12:
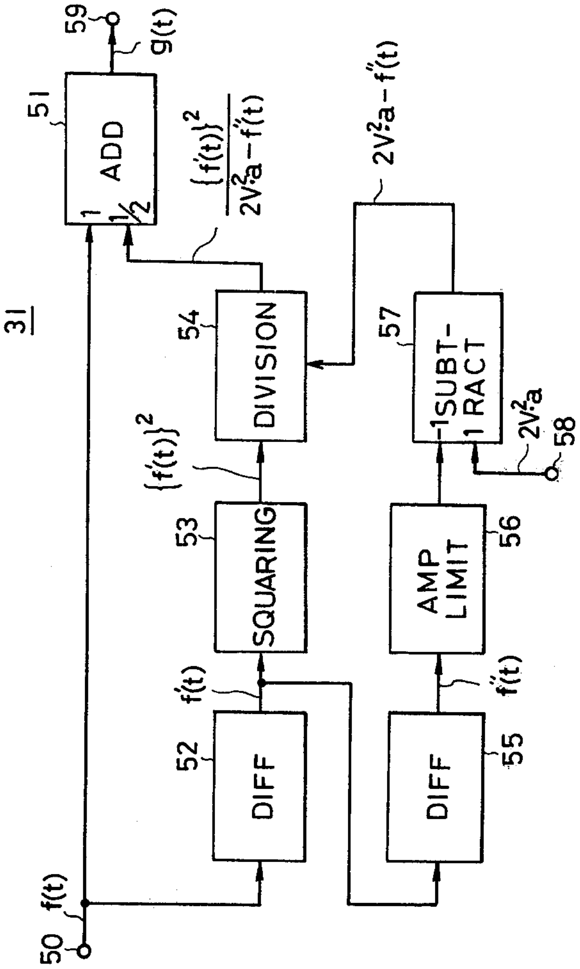
FIG. 12 is a block diagram showing one embodiment of a distortion imparting circuit, constituting an essential part of the system part shown in FIG. 10.
Figure 17:
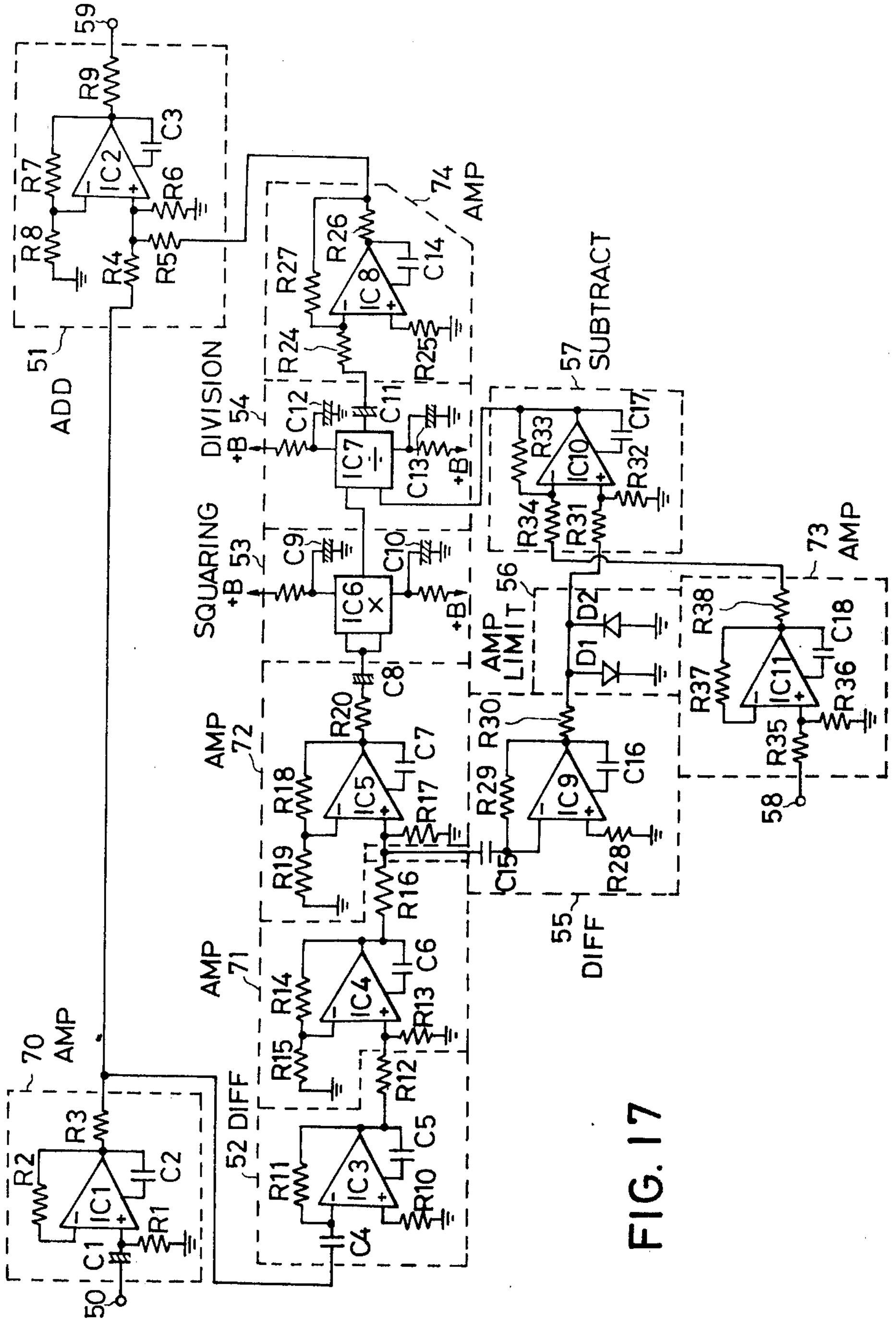
FIG. 17 is a circuit diagram of one embodiment showing a electrical circuit for use in the block diagram in FIG. 12.

Next to be described is the schematic circuit diagram (FIG. 17) of one embodiment for completing the block diagram of FIG. 12. Those parts which are the same as corresponding parts in FIG. 12 are designated by like reference numerals and characters.

The original signal $f(t)$, introduced through the input terminal 50, is voltage amplified by a voltage amplification circuit 70 comprising resistors R1, R2, and R3, a capacitor C1, and an operational amplifier IC1. Then, it is supplied to be addition circuit 51 comprising resistors R4 through R9, a capacitor C3, and an operational amplifier IC2 and to a differentiation circuit 52 comprising resistors R10, R11, and R12, capacitors C4 and C5, and an operational amplifier IC3. The signal $f'(t)$ is differentiated by the differentiation circuit 52 and passed through a voltage amplification circuit 71 comprising resistors R13 through R16, a capacitor C6, and an operational amplifier IC4. It is then supplied, on one hand, by way of a voltage amplifier 72 comprising resistors R17 through R20, capacitors C7 and C8, and an operational amplifier IC5 to the squaring circuit 53 comprising capacitors C9 and C10 and a multiplier IC6. On the other hand, it is also supplied to the differentiation circuit 55 comprising resistors R28, R29, and R30 and capacitors C15 and C16. The output signal $\{f(t)\}^2$ of the squaring circuit 53 is supplied to the division circuit 54, comprising capacitors C11, C12, and C13 and a divider IC7.

The output signal $f''(t)$ of the differentiation circuit 55 is supplied to and amplitude limited by the amplitude limiting circuit 56 comprising parallel diodes D1 and D2 connected in mutually opposite directions Then the signal is supplied as a subtrahend to the subtraction circuit 57 comprising resistors R31 through R34, a capacitor C17, and an operational amplifier IC10. This subtraction circuit 57 also receives the signal $2V^2\cdot a$ which is supplied from the input terminal 58 through a voltage amplification circuit 73 comprising resistors R35 through R38, a capacitor C18, and an operational amplifier IC11. The subtraction circuit 57 produces an output signal $\{2V^2\cdot a - f''(t)\}$, which is supplied to the aforementioned division circuit 54.

The output signal $\{f'(t)\}^2/\{2V^2\cdot a - f''(t)\}$ passes through a voltage amplifier 74 comprising resistors R24 through R27, a capacitor C14, and an operational amplifier IC8 and is then supplied to the aforementioned addition circuit 51. The resulting output recording signal $g(t)$ of the addition circuit 51 is led out through the output terminal 59.

One example of specific constants of various elements in the circuit of the above described organization is as follows:

| | | | | | | |
|---|---|---|---|---|---|---|
| Resistors: | | | | | | |
| | R1 | 33 | kΩ | R2 | 33 | kΩ |
| | R3 | 120 | Ω | R4 | 33 | kΩ |
| | R5 | 33 | kΩ | R6 | 47 | kΩ |
| | R7 | 56 | kΩ | R8 | 33 | kΩ |
| | R9 | 120 | Ω | R10 | 3.3 | kΩ |
| | R11 | 3.3 | kΩ | R12 | 120 | Ω |
| | R13 | 33 | kΩ | R14 | 33 | kΩ |
| | R15 | 33 | kΩ | R16 | 120 | Ω |
| | R17 | 33 | kΩ | R18 | 33 | kΩ |
| | R19 | 6 | kΩ | R20 | 82 | Ω |
| | R24 | 52 | kΩ | R25 | 2.5 | kΩ |
| | R26 | 120 | Ω | R27 | 3.3 | kΩ |
| | R28 | 33 | kΩ | R29 | 33 | kΩ |
| | R30 | 120 | Ω | R31 | 2.7 | kΩ |
| | R32 | 3.3 | kΩ | R33 | 27 | kΩ |
| | R34 | 2.7 | kΩ | R35 | 2.7 | kΩ |
| | R36 | 3.3 | kΩ | R37 | 10 | kΩ |
| | R38 | 82 | Ω | | | |
| Capacitors: | | | | | | |
| | C1 | 10 | μF | C2 | 33 | PF |
| | C3 | 47 | PF | C4 | 3300 | PF |
| | C5 | 18 | PF | C6 | 33 | PF |
| | C7 | 47 | PF | C8 | 10 | μF |
| | C9 | 10 | μF | C10 | 10 | μF |

-continued

| | | | | | |
|---|---|---|---|---|---|
| C11 | 4.7 | μF | C12 | 10 | μF |
| C13 | 10 | μF | C14 | 47 | PF |
| C15 | 3300 | PF | C16 | 28 | PF |
| C17 | 47 | PF | C18 | 100 | PF |

Further, this invention is not limited to these embodiments but various variations and modifications may be made without departing from the scope and spirit of the invention.

What we claim is:

1. A record disc recording system comprising:

a cutter head for recording a signal in a sound grove on a disc;

means for producing a signal which varies in accordance with the position of the cutter head as it travels over the disc, said signal being substantially represented by $2V^2 \cdot a$, where $V$ is the relative linear velocity between the cutter head and the disc, and $a$ is a specific coefficient;

means responsive to an original signal $f(t)$ and the signal $2V^2 \cdot a$ for forming a distortion signal represented by $\{f'(t)\}^2 / \{2V^2 \cdot a - f''(t)\}$, which constantly conforms to the condition $|2V^2 \cdot a| > |f''(t)|$; and means responsive to the original signal $f(t)$ and the distortion signal $\{f'(t)\}^2 / \{2V^2 \cdot a - f''(t)\}$ for producing a recording signal with a distortion represented by $g(t) = f(t) + \{f'(t)\}^2 / 2\{2V^2 \cdot a - f''(t)\}$ which is applied to the cutter head.

2. A record disc recording system as claimed in claim 1 in which the specific coefficient $a$ is approximately $0.57/r$, where $r$ is the radius of the tip of a reproducing stylus used in a reproducing system.

3. A record disc recording system as claimed in claim 1 in which the distortion signal forming means includes means for amplitude limiting the second order differential signal $f''(t)$ obtained from the original signal $f(t)$ in a manner such that $|2V^2 \cdot a| > |f''(t)|$.

4. A record disc recording system as claimed in claim 1 in which the means for producing the signal $2V^2 \cdot a$ includes means responsive to the traversing of the cutter head across a record disc for producing a voltage proportional to the square of the distance $l$ of the cutter head from the center of the disc.

5. A record disc recording system as claimed in claim 1 in which the distortion signal forming circuit comprises: a first differentiation circuit means for differentiating the original signal $f(t)$ and producing a first order differential signal $f'(t)$; a squaring circuit means responsive to the first order differential signal $f'(t)$ for squaring the signal $f'(t)$ to produce a signal $\{f'(t)\}^2$; a second differentiation circuit means responsive to the first order dirrerential signal $f'(t)$ for differentiating the same to produce a second order differential signal $f'\lambda\, '(t)$; means for amplitude limiting the second order differential signal $f''(t)$ so that the condition $|2V^2 \cdot a| > \lambda\, |f''(t)|$ will always be maintained; a subtraction circuit means supplied with the signal $2V^2 \cdot a$ as a minuend and the signal $f''(t)$ as a subtrahend for producing an output signal $\{2V^2 \cdot a - f''(t)\}$; and a division circuit means responsive to the signal $\{f'(t)\}^2$ from the squaring circuit as a dividend and to the signal $\{2V^2 \cdot a - f''(t)\}$ from the subtraction circuit as a divisor for producing an output signal $\{f'(t)\}^2 / \{2V^2 \cdot a - f''(t)\}$.

6. A record disc recording system as claimed in claim 1 in which the means for producing the recording signal $g(t)$ comprises an addition circuit responsive to the original signal $f(t)$ and to the distortion signal $\{f'(t)\}^2 / \{2V^2 \cdot a - f''(t)\}$ for adding the same in a proportion of 2 to 1.

* * * * *